United States Patent [19]
Kataoka et al.

[11] Patent Number: 6,106,949
[45] Date of Patent: *Aug. 22, 2000

[54] REFORMED POLYIMIDE FLUOROCARBON RESIN LAMINATED FILM

[75] Inventors: Kosuke Kataoka; Eiichiro Kuribayashi; Yoshihide Ohnari, all of Otsu, Japan

[73] Assignee: Kanegafuchi Kagaku Kogyo Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/759,682

[22] Filed: Dec. 6, 1996

Related U.S. Application Data

[63] Continuation of application No. PCT/JP96/00951, Apr. 4, 1996.

[30] Foreign Application Priority Data

Apr. 6, 1995 [JP] Japan .................................. 7-108082
Apr. 6, 1995 [JP] Japan .................................. 7-108083

[51] Int. Cl.⁷ ................................................ B32B 27/08
[52] U.S. Cl. ...................... 428/422; 428/473.5; 427/535; 427/536
[58] Field of Search ................... 428/422, 473.5; 427/535, 536

[56] References Cited

U.S. PATENT DOCUMENTS

| | | | |
|---|---|---|---|
| 5,006,411 | 4/1991 | Motonari et al. | 428/421 |
| 5,112,682 | 5/1992 | Inouye et al. | 428/353 |

FOREIGN PATENT DOCUMENTS

| | | |
|---|---|---|
| 49-012900 | 3/1974 | Japan . |
| 60-071249 | 4/1985 | Japan . |
| 62-162543 | 7/1987 | Japan . |
| 4-135843 | 5/1992 | Japan . |

*Primary Examiner*—D. S. Nakarani
*Attorney, Agent, or Firm*—Pillsbury Madison & Sutro LLP

[57] ABSTRACT

The present invention provides a reformed polyimide fluorocarbon resin laminated film having superior adhesive property with metals.

The reformed polyimide fluorocarbon resin laminated film according to the present invention is constructed by that a surface of fluorocarbon resin of polyimide fluorocarbon resin laminated film having fluorocarbon resin being laminated on a single surface or both surfaces of a polyimide film is coated with a coupling agent, or executed with corona treatment.

7 Claims, 3 Drawing Sheets

REFORMED POLYIMIDE FLUOROCARBON RESIN LAMINATED FILM

This is a Continuation of International Appln. No. PCT/JP96/00951 filed Apr. 4, 1996 which designated the U.S.

FIELD OF THE INVENTION

The present invention relates to a reformed polyimide fluorocarbon resin laminated film featuring distinguished adhesive property against metals.

BACKGROUND ART

Because of distinguished flexibility, substantial resistance against degradation in the environment during use, and distinguished resistant properties against heat and chemicals, normally, polyimide fluorocarbon resin laminated films are used in the form of insulation material of electric wires and a variety of motors. When being used, a polyimide fluorocarbon resin laminated film is formed into tape, the tape-form film is wound on copper wires via a taping machine, and then the film is thermally adhered with fluorocarbon resin via predetermined thermal treatment. In this case, since substantial tension is added to the tape-form film, unless the polyimide film is fully adhered to the fluorocarbon resin layer, the polyimide fluorocarbon resin laminated film incurs peeling to result in difficult processing work.

Because of this problem, whenever processing such a polyimide fluorocarbon resin laminated film, it has been demanded that fluorocarbon resin be solidly adhered to a polyimide film. In order to promote adhesion between a polyimide film and a fluorocarbon resin layer in the course of producing such a polyimide fluorocarbon resin laminated film, superficial reformation of the polyimide film and reformation of the fluorocarbon resin have thus been executed.

Recently, owing to outstanding dimensional stability, thermal resistant property, and mechanical characteristic, polyimide fluorocarbon resin laminated films have also been used to form a masking tape of a film capacitor in particular. Such a film capacitor comprises a base PET film on which a metallic layer pattern is formed. In the course of producing such a film capacitor, for example, a tape-form polyimide fluorocarbon resin laminated film is placed on a base PET film, and then, after executing a process for adhering vaporized aluminium, a variety of metals are laminated, and finally, the polyimide fluorocarbon resin laminated film is removed therefrom to eventually form a metallic layer pattern on the PET film.

Nevertheless, in the case of using such a polyimide fluorocarbon resin laminated film to form a masking tape of a film capacitor, even though adhesion between a polyimide film and fluorocarbon resin layer of polyimide fluorocarbon resin laminated film may have been improved, if fluorocarbon resinous layer were insufficiently adhered with aluminium in the course of adhering vaporized aluminium, metal portion adhered to the film could easily be peeled while removing polyimide fluorocarbon resin laminated film in the following process to result in the generation of dust as another problem.

DISCLOSURE OF THE INVENTION

The essential of the reformed polyimide fluorocarbon resin laminated film related to the invention is to execute corona treatment against a surface of fluorocarbon resin layer of polyimide fluorocarbon resin laminated film having fluorocarbon resin being laminated on a single surface or both surfaces of a polyimide film under the condition of 100 W·min./m$^2$ or more than 10 W·min./m$^2$ of corona density.

The essential of the reformed polyimide fluorocarbon resin laminated film related to the invention is to coat a surface of fluorocarbon resinous layer of polyimide fluorocarbon resin laminated film having fluorocarbon resin being laminated on a single surface or both surfaces of a polyimide film with a coupling agent.

In particular, the above-referred coupling agent applicable to the reformed polyimide fluorocarbon resin laminated film is specified to be a silane coupling agent.

The other essential of the reformed polyimide fluorocarbon resin laminated film is to execute corona treatment and treatment of applying a coupling agent on a surface of fluorocarbon resin layer in polyimide fluorocarbon resin laminated film having fluorocarbon resin being laminated on a single surface or both surfaces of a polyimide film.

BEST EMBODIMENT OF THE INVENTION

Figure 1:
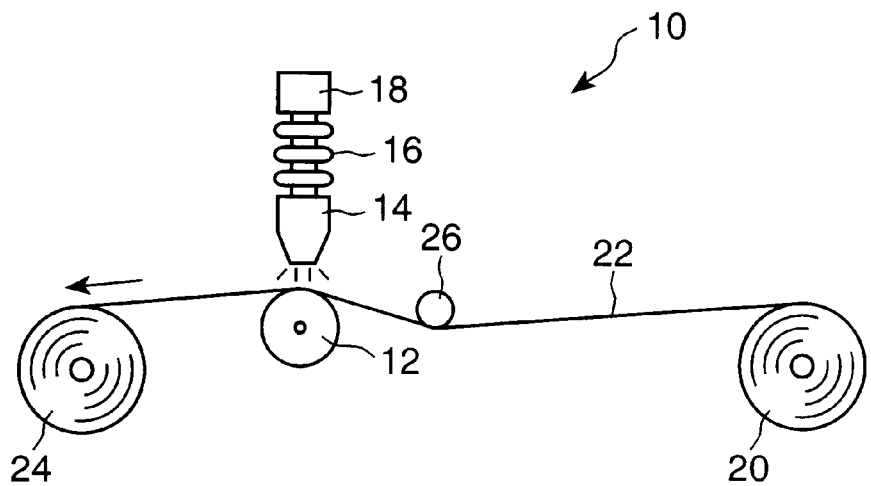
FIG. 1 is explanatory of a device for corona treatment for producing a reformed polyimide fluorocarbon resin laminated film related to the invention.

A reformed polyimide fluorocarbon resin laminated film related to the invention comprises executing corona treatment against a surface of fluorocarbon resinous layer of a polyimide fluorocarbon resin laminated film having fluorocarbon resin being laminated on a single surface or both surfaces of a polyimide film under a condition of 100 W·min./m$^2$ or more than 100 W·min./m$^2$ of corona density, or applying a coupling agent, especially a silane coupling agent to the surface of fluorocarbon resinous layer of the film. One example of the invention will be explained below, however the invention is not restricted to the example.

A well-known polyimide fluorocarbon resin laminated film may be applied for the present invention. A polyimide film described in the present invention can be obtained by a well-known method by using aromatic diamine represented by 4,4'-diamino diphenyl ether and aromatic tetracarbonic acid dianhydride represented by pyromellitic acid dianhydride. Thickness of the polyimide film described in the present invention is not particularly restricted, however, in considering the range of the film to be used, it is preferable to use a polyimide film of 7 µm to 125 µm of thickness. Instead of the polyimide film described above, a film obtained by forming quasi-imide material such as polyamide-imide and polyether imide may be utilized. Polyimide film in the present invention contains such a film. Further, the polyimide film may be formed by adding various kinds of filler or reinforcing agent, and the formation of the polyimide film is not restricted.

Fluorocarbon resin usable for effecting the invention normally contains a minimum of 20% by weight of fluorine, preferably 50% to 76% by weight of fluorine. Concretely, typical examples include tetrafluoroethylene-hexafluoropropylene copolymer (FEP), tetrafluoroethylene-perfluoroalkylvinyl ether (PFA), tetrafluoroethylene-ethylene co-polymer (ETFE), and tetrafluoroethylene (PTFE), etc.

Any practical method for forming fluorocarbon resin layer on a single surface or both surfaces of a polyimide film may be used. For example, a method for laminating (thermal adhesion with pressure) a fluorocarbon resin film thereon or a method for coating said surface with a dispersed solution (dispersion) of fluorocarbon resin followed by a drying process and a firing process may be used. It is also allowable to form a fluorocarbon resin layer on the surface of polyimide film after completing the surface treatment so that adhesion to fluorocarbon resin can be promoted.

When executing corona treatment against a surface of the fluorocarbon resin layer of polyimide fluorocarbon resin laminated film yielded via the above processes, the corona treatment is applied onto the surface of the fluorocarbon resinous layer of the yielded polyimide fluorocarbon resin laminated film based on a condition that prescribes a minimum of 100 W·min./m$^2$ of corona density, preferably in a range from 100 to 700 W·min./m$^2$ thereof before eventually producing a reformed polyimide fluorocarbon resin laminated film related to the invention.

Any conventional apparatus may be used for effecting corona treatment. For example, a corona treatment apparatus 10 shown in FIG. 1 comprising an extremely insulated roll 12 and a linear corona electrode 14 disposed close to the roll 12 may be used. The corona electrode 14 is formed in accordance with a length needed for executing corona treatment, in other words, in accordance with substantial width of the polyimide film. The corona electrode 14 is secured to a frame 18 via a plurality of insulators 16. It is so arranged that corona discharge is generated from the corona electrode simultaneous with delivery of high energy thereto. In consequence, corona treatment is executed against a single surface of a laminated film 22 fed out from a film feeder 20 before the film 22 is wound on a film winder 24. The reference numeral 26 designates a convey roll which enables the laminated film 22 to smoothly run itself inside of the apparatus 10.

Figure 2:
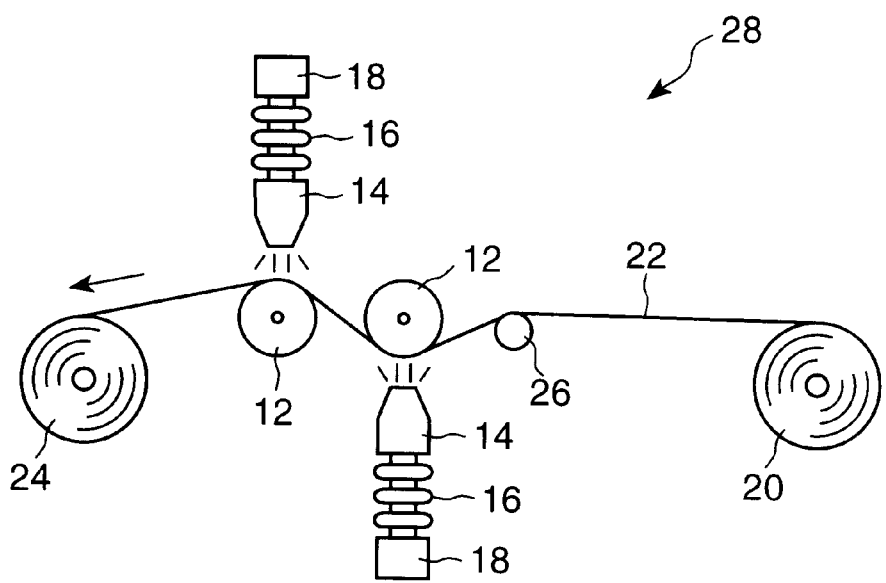
FIG. 2 is explanatory of another device for corona treatment for producing a reformed polyimide fluorocarbon resin laminated film related to the invention.

As is exemplified by another apparatus 28 shown in FIG. 2, it is also allowable to provide a pair of linear corona electrodes 14 in opposition from a pair of rolls 12 so that corona treatment can simultaneously be executed against both surfaces of the film 22.

Although drawing is deleted, in order to prevent crease from being generated otherwise caused by thermal expansion of the film while executing corona treatment, it is also practicable to apply corona treatment once or plural times after providing elongation in the direction of the film width. It is also practicable to simultaneously remove static electricity and fine powder particles adhered to the film by way of blowing ionized gas containing polarity inverse from that of static electricity charged on the film after completion of the corona treatment.

In place of the corona treatment, it is also practicable to execute plasma treatment against the polyimide fluorocarbon resin laminated film related to the invention. Execution of plasma treatment provides the same effect as that is yielded from the corona treatment.

The plasma processing apparatus is structured to feed a polyimide fluorocarbon resin laminated film into a gas-sealed apparatus before generating plasma by effect of electrical discharge. Power density is properly set according to composition and pressure of gas. Electrical discharge can be set off at 300 W·min./m$^2$ to 4000 W·min./m$^2$.

Gas pressure in the atmosphere for executing plasma treatment is not specifically defined, but so-called vacuum plasma or plasma under normal pressure is applicable. It is desired that plasma treatment be executed under pressure in a range between 100 Torr to 1000 Torr. This is because a vacuum device is needed if plasma treatment were executed below 100 Torr of pressure, and conversely, if pressure exceeds 1000 Torr, glow discharge cannot easily be implemented. In particular, execution of plasma treatment under atmospheric pressure is preferred because it provides inexpensive cost for facilities and better operating efficiency. Although gas composition available for plasma treatment is not specifically defined, it is however desired that plasma treatment be executed under atmosphere solely filled with rare-gas elements or mixed gas in order that glow discharge can be generated even under presence of 100 Torr to 1000 Torr of pressure. Although it is particularly desired that atmosphere inside of the plasma generating apparatus be replaced with rare-gas elements, air may be intermixed therein.

As was described above, by way of implementing corona treatment or plasma treatment, it is possible to chemically modify a film surface to introduce hydrophilic functional radicals such as hydroxyl, carbonic-acid radical, carbonyl radical, etc., thus improving hydrophilic property of the film surface.

Next, as a practical example of the reformed polyimide fluorocarbon resinous film related to the invention, a method of processing a solution of coupling agent for adhering this solution onto a surface of fluorocarbon resinous film is described below. A coupling agent conjunctionally contains a functional radical having reactivity against a film and another functional radical having reactivity against an adhesive agent in own molecules, and thus, these radicals intermediate to promote affinity between the film and the adhesive agent. In particular, silane coupling agents are preferred for use. More specifically, preferred silane coupling agents are cited below:

γ-aminopropyltriethoxy silane, γ-glycidoxypropyltrimethoxy silane, γ-chloropropyltrinethoxy silane, N-phenyl-γ-aminopropyltrimethoxy silane, N-β(aminoethyl)γ-aminopropyltrimethoxy silane, N-β(aminoethyl)γ-amincpropyl-methyldimethoxy silane, etc.

Any of the above-cited coupling agents may be used insofar as a usable coupling agent is soluble in a solvent capable of dissolving it. However, it is preferred that an alcoholic solvent such as methanol or ethanol be used. It is desired that a coupling agent dissolved in a solvent has 0.005% to 20% by weight of density. This is because if it had less than 0.005% by weight of density, effect of coating a film surface with a coupling agent cannot be confirmed, and conversely, if it had more than 20% by weight of density, it will generate a film of a coupling agent on the film surface to result in the lowered adhesion of metals. It is permissible to add a deforming agent to a solution of coupling agent in order to eliminate foam generated in the course of coating a film surface with a solution of coupling agent.

Figure 3:
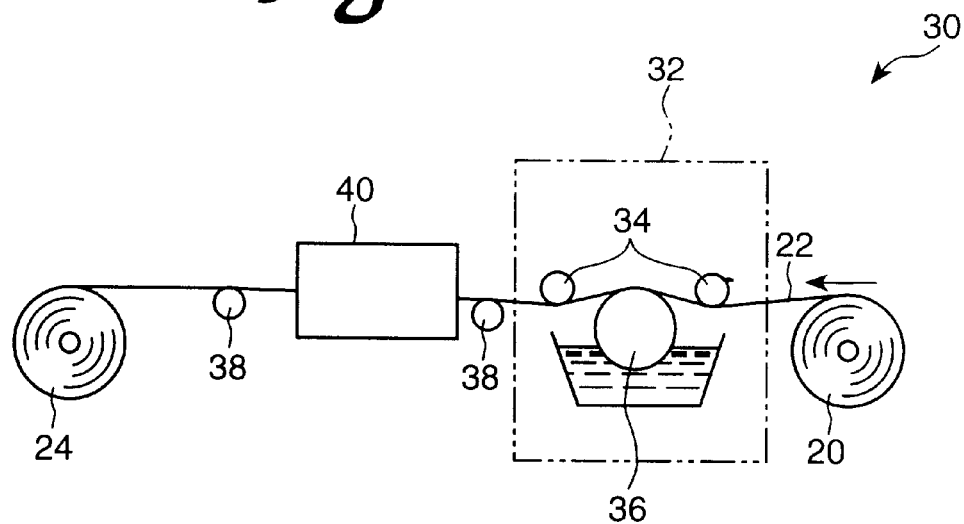
FIG. 3 is explanatory of a device for applying a solution of coupling agent for producing a reformed polyimide fluorocarbon resin laminated film related to the invention.

There are a variety of methods for coating a surface of fluorocarbon resin layer of polyimide fluorocarbon resin laminated film with a coupling agent including a method to dip the film in a solution of coupling agent, a method to coat the film surface with a solution of coupling agent in liquid form or via spraying, or a method to coat the film surface with a roller or a brush impregnated with a solution of coupling agent. For example, a surface processing apparatus 30 shown in FIG. 3 is provided with a device 32 for coating a film surface with a solution of coupling agent, in which a polyimide fluorocarbon resin laminated film 22 is adjusted so that it can be brought into contact with a bar coater 36 by a pair of pressing rolls 34. Accordingly, by causing a convey roll 38 to run the polyimide fluorocarbon resin laminated film 22 out from the film feeder 20 towards the film winder 24 at a constant tension while rotating the bar coater 36, the film surface can be coated with a solution of coupling agent. The polyimide fluorocarbon resin laminated film 22 coated with a solution of coupling agent is then delivered to a drying furnace 40 for drying said solution adhered onto the film surface before eventually being wound on the film winder 24. Neither the direction of the rotation of the bar coater 36 nor the substrate material thereof nor the coating method other than the present example is specified, and any method may be applied without limitation insofar as no obstacle occurs to the coating of a film surface with a solution of coupling agent. The film coated with a solution of coupling agent is then dried until a solvent of solution of coupling agent evaporates, and finally a reformed polyimide fluorocarbon resin laminated film related to the invention is completed.

Although mechanism of generation of adhesive property by the coated coupling agent is not yet clearly known, it is inferred that, since fluorocarbon resin is subject to thermal treatment at a high temperature during the process for producing fluorocarbon resin laminate, i.e., during a process for laminating fluorocarbon resin film and a process for coating a film surface with dispersion, oxidation has been generated on the film surface to result in the generation of a functional radical thereon.

The surface of a fluorocarbon resin layer of polyimide fluorocarbon resin laminated film may be executed by both of the above described corona treatment or plasma treatment and the treatment of applying a coupling agent. In this case the order of performing these treatments may be arbitrary, however, it is preferable to perform the treatment of applying a coupling agent after the corona or plasma treatment. The corona or plasma treatment and the treatment of applying a coupling agent may be performed continuously, or may be executed in different processes.

Figure 4:
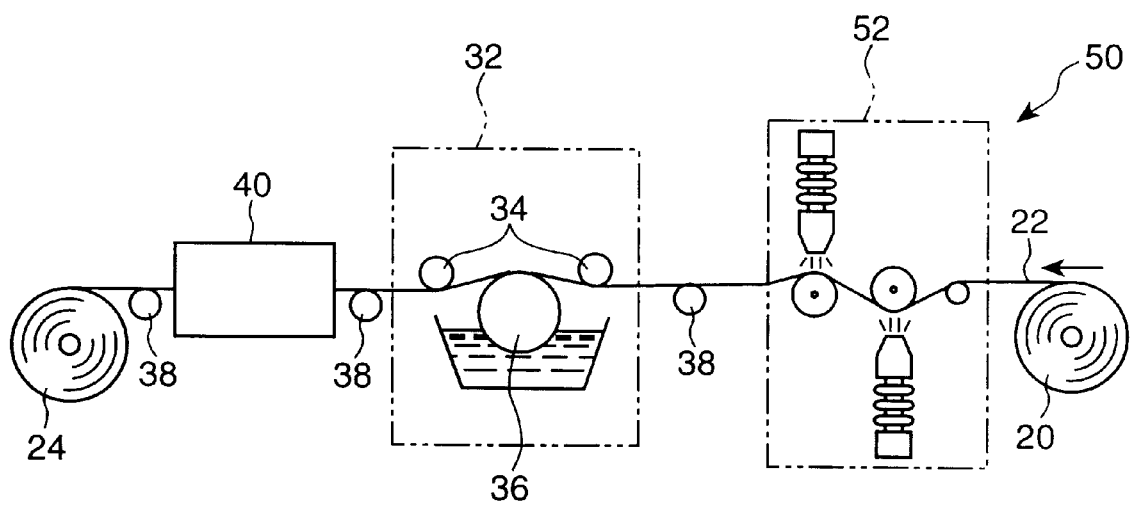
FIG. 4 is another example for producing a reformed polyimide fluorocarbon resin laminated film related to the invention.
Figure 5:
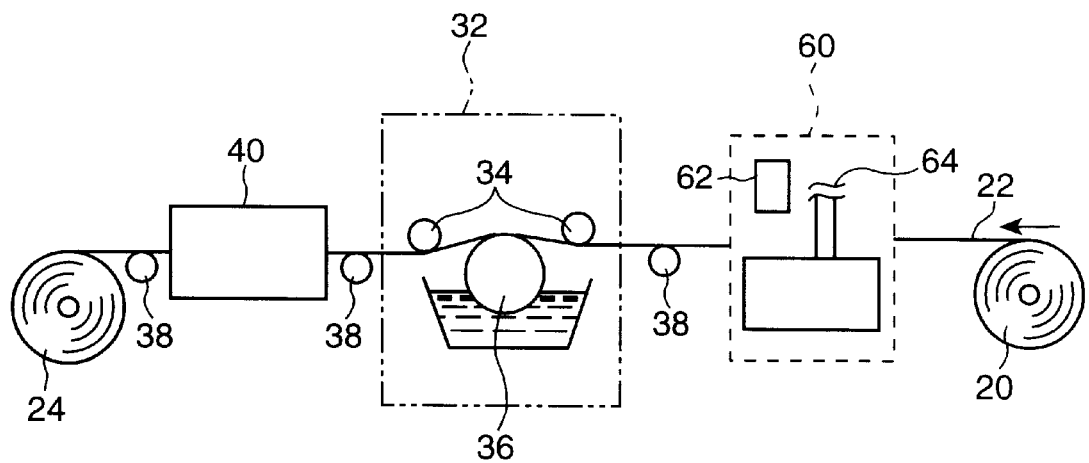
FIG. 5 is further another example for producing a reformed polyimide fluorocarbon resin laminated film related to the invention.

One method to perform the above processes continuously can be executed by using a surface treatment device 50 shown in FIG. 4, for example. In the surface treatment device 50, corona treatment is performed by that at first a polyimide fluorocarbon resin laminated film 22 is fed in a corona treatment device 52. The surface-treated polyimide fluorocarbon resin laminated film 22 is transferred to a device 32 for coating the film with a solution of coupling agent to coat the film with a solution of coupling agent. Thereafter, in a drying furnace 40 said solution adhered on the film surface is dried, followed by that the film is wound on a winding device 24. Though corona treatment is executed in the Examples of the present invention, plasma treatment may be executed instead of the corona treatment as shown in FIG. 5. In FIG. 5 the reference numeral 60 indicates a plasma generating device, the reference numeral 62 indicates electric power and the reference numeral 64 indicates a gas introducing part.

Thus produced reformed polyimide fluorocarbon resin laminated film of the present invention obtains superior adhesive property against metals. For example, in the case when an aluminium film is formed on the laminated film via aluminium evaporation, the aluminium film adhered on the laminated film is adhered with superior adhesive intensity compared with the case when it is adhered on a conventional untreated laminated film. Accordingly, said reformed polyimide fluorocarbon resin laminated film can be preferably used for a masking tape for a film capacitor without causing peeling of a metallic layer adhered on film.

Figure 6:
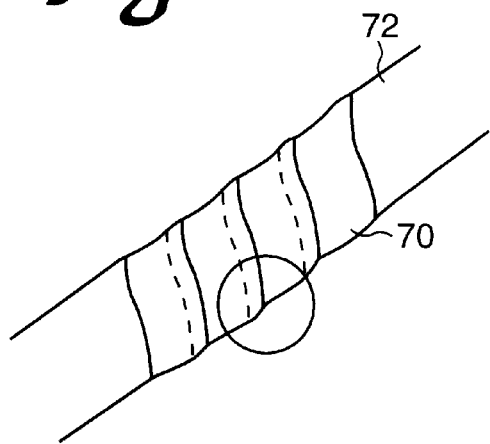
FIG. 6 is an example of a reformed polyimide fluorocarbon resin laminated film related to the invention being used for covering an electrical wire.
Figure 7A:
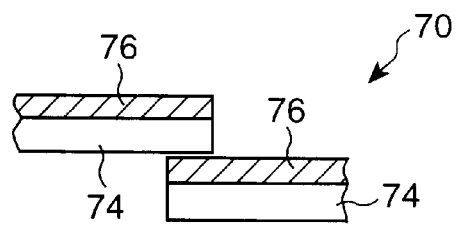
FIG. 7(a) and FIG. 7(b) are enlarged views of overlapped parts of the reformed polyimide fluorocarbon resin laminated film related to the invention shown in FIG. 6 in the case the film is coated on an electrical wire.
Figure 7B:
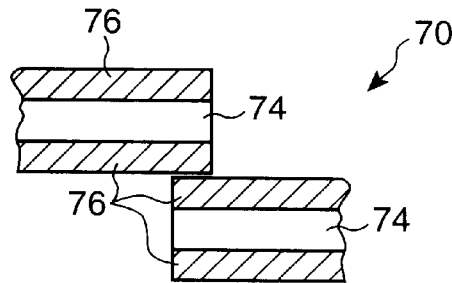

The reformed polyimide fluorocarbon resin film is most suited for covering electrical wires. For example, FIG. 6 exemplifies a case of covering an electrical wire 72 with a reformed polyimide fluorocarbon resinous film 70 related to the invention, in which the tape-form film 70 is used for covering the electrical wire 72 by way of partially being overlapped when covering it. Accordingly, adhesive property between the film and the electrical wire and between the tape-form films is quite important. More particularly, FIG. 7(*a*) and 7(*b*) are respectively enlarged views of overlapped portions of the reformed polyimide fluorocarbon resin film 70 related to the invention shown in FIG. 6 when being used for covering the electrical wire 72. When fluorocarbon resin 76 is laminated on a single surface of a polyimide film 74 (FIG. 7(*a*)), adhesive property between the surface of fluorocarbon resin and polyimide film is quite important. When fluorocarbon resin 76 is laminated on both surfaces of the polyimide film 74 (FIG. 7(*b*), adhesive property between fluorocarbon resins is quite important. In the case of using the polyimide fluorocarbon resin film related to the invention, adhesive property between the above-cited fluorocarbon resins and between different materials such as fluorocarbon resin, electrical wire, and other films, can be secured.

Referring now to practical examples, the invention is more concretely described below. It should be understood however that the scope of the invention is by no means limited to the following examples, but the invention can be embodied by way of adding a variety of improvements, changes, and modifications, based on knowledges of those skilled in the art within a scope without deviating from the essentials of the invention.

EXAMPLES 1 TO 4

Initially, a polyimide fluorocarbon resin laminated film was produced by forming 25 $\mu$m thick fluorocarbon resin layers by way of laminating FEP (tetrafluoroethylene-hexafluoropropylene copolymer) on both surfaces of a 75 $\mu$m thick polyimide film "APICAL" 75AH (a product of Kanegafuchi Chemical Industrial Co., Ltd.). In the meantime, γ-aminopropyltriethoxy silane (silane coupling agent KBE 903, a product of Shin-etsu Chemical Industrial Co., Ltd.) was dissolved in methanol to prepare methanol solutions of coupling agent containing 0.01%, 0.1%, 1%, and 10% of concentration. Next, surfaces of fluorocarbon resinous layers of the above-referred polyimide fluorocarbon resin laminated film were coated with the above-referred 4 kinds of solution of coupling agent, and then, after drying the coated solution at 80° C. for 1 minute, a reformed polyimide fluorocarbon resin laminated film related to the invention was produced.

Next, vaporized aluminium was adhered onto the reformed polyimide fluorocarbon resin laminated film produced via the above processes. Then, a 20 μm thick aluminium film was formed via an electrolytic plating process, and then samples having 3 cm×8 cm of dimension were cut out to form 5 units of 3 mm pattern. Next, using an Instron Tensile Tester, peeling strength (kg/cm) on the aluminium film and the film surface was measured at 90° of peeling angle and at 50 mm/min. of peeling rate, and then adhesive property was evaluated by referring to n=5 of rated mean value as adhesive strength. Evaluated results are shown in Table 1.

TABLE 1

|  | Coupling agent concentration (W %) (γ-aminopropyl-triethoxy silane) | Adhesive property (kg/cm) |
| --- | --- | --- |
| Ex. 1 | 0.01 | 0.5 |
| 2 | 0.1 | 0.6 |
| 3 | 1.0 | 0.6 |
| 4 | 10.0 | 0.6 |
| Co. Ex. 1 | — | 0.1 |

EXAMPLES 5 AND 6

As a coupling agent, methanol solutions of coupling agent containing respectively 1% of concentration were prepared by using γ-glycidoxypropyltrimethoxy silane (silane coupling agent EBM 403, a product of Shin-etsu Chemical Industrial Co., Ltd.) and γ-chloropropyltrimethoxy silane KBM 573, a product of Shin-etsu Chemical Industrial Co., Ltd.). Except for using these two kinds of solution of coupling agent, the reformed polyimide fluorocarbon resin laminated film related to the invention was produced by the same processes as Example 1, and the adhesive property was evaluated. Evaluated results are shown in Table 2.

TABLE 2

|  | Coupling agent 1% | Adhesive property (kg/cm) |
| --- | --- | --- |
| Ex. 5 | γ-glycidoxypropyltrimethoxy silane | 0.6 |
| 6 | γ-chloropropyltrimethoxy silane | 0.6 |

EXAMPLES 7 TO 11

Initially, a polyimide fluorocarbon resin laminated film was produced by forming 25 μm thick fluorocarbon resinous layers by way of laminating FEP (tetrafluoroethylene-hexafluoropropylene copolymer) on both surfaces of a 75 μm thick polyimide film "APICAL" 75AH (a product of Kanegafuchi Chemical Industrial Co., Ltd.).

Next, surfaces of fluorocarbon resinous layers of the above-referred polyimide fluorocarbon resin laminated film were executed with corona treatment under the conditions of 100 W·min./m$^2$, 200 W·min./m$^2$, 300 W·min./m$^2$, 400 W·min./m$^2$ and 500 W·min./m$^2$ of corona density, and 5 kinds of reformed polyimide fluorocarbon resin laminated film related to the invention w,ere produced. The reformed polyimide fluorocarbon resin laminated film related to the invention was produced by the same process as Example 1, and the adhesive property was evaluated. Evaluated results are shown in Table 3.

TABLE 3

|  | Corona density (W · min./m$^2$) | Adhesive property (kg/cm) |
| --- | --- | --- |
| Ex. 7 | 100 | 0.4 |
| 8 | 200 | 0.5 |
| 9 | 300 | 0.6 |
| 10 | 400 | 0.6 |
| 11 | 500 | 0.5 |

EXAMPLES 12 TO 16

The surfaces of fluorocarbon resinous layers of the polyimide fluorocarbon resin laminated film obtained by executing the corona treatment in the same process as Examples 7 to 11, were further executed with treatment of a solution of coupling agent by using γ-aminopropyltriethoxy silane in the same process as Example 2. Thus, reformed polyimide fluorocarbon resin laminated film related to the invention was produced. Evaluated results of the adhesive property are shown in Table 4.

TABLE 4

|  | Corona density (W · min./m$^2$) | Coupling agent concentration (W %) | Adhesive property (kg/cm) |
| --- | --- | --- | --- |
| Ex. 12 | 100 | 0.1 | 0.6 |
| 13 | 200 | 0.1 | 0.7 |
| 14 | 300 | 0.1 | 0.8 |
| 15 | 400 | 0.1 | 0.8 |
| 16 | 500 | 0.1 | 0.8 |

(γ-aminopropyltriethoxy silane was used for the coupling agent.)

Comparative Example 1

Initially, a polyimide fluorocarbon resin laminated film was produced after forming 25 μm thick fluorocarbon resinous layers on both surfaces of a 75 μm thick polyimide film "APICAL" 75AH (a product of Kanegafuchi Chemical Industrial Co., Ltd.) in the same process as Example 1. Thereafter, a 20 μm thick aluminium film was formed via aluminium evaporation and electrolytic plating process with neither applying a solution of coupling agent nor executing corona treatment. In the same process as Example 1 adhesive property was evaluated. Evaluated result is shown in Table 1.

Industrial Applicability

As the above described, the reformed polyimide fluorocarbon resin laminated film related to the invention comprises applying a coupling agent to a surface of fluorocarbon resinous layer of a polyimide fluorocarbon resin laminated film having fluorocarbon resin being laminated on a single surface or both surfaces of a polyimide film or executing corona treatment against the surface of fluorocarbon resinous layer of the film under the condition of 10 W·min./m$^2$ or more than 100 W·min./m of corona density. A polyimide fluorocarbon resin laminated film can be provided with superior adhesive property against metals via the construction. As the result, providing a suitable masking tape of a film capacitor can be realized by the present invention. In addition, a reformed polyimide fluorocarbon resin laminated film related to the invention can secure adhesive property between different materials such as fluorocarbon resin, electrical wire, and other films, and the film is most suitable for covering electrical wires.

We claim:

1. A reformed polyimide fluorocarbon resin laminated film having 0.4–0.8 kg/cm of adhesive strength when tested by 90° peel strength of adhesion between said film and an electroplated aluminum layer, said film produced by a method comprising the steps of:

laminating a fluorocarbon resin layer on a single surface or both surfaces of a polyimide film;

coating a surface of the fluorocarbon resin layer with a coating composition consisting of a silane coupling agent and a solvent; and drying.

2. The reformed polyimide fluorocarbon resin laminated film according to claim 1, wherein said coupling agent is a silane coupling agent having a functional group selected from the group consisting of chloro, glycido and amino.

3. A reformed polyimide fluorocarbon resin laminated film having 0.4–0.8 kg/cm of adhesive strength when tested by 90° peel strength of adhesion between said film and an electroplated aluminum layer, said film produced by a method comprising the steps of:

laminating a fluorocarbon resin layer on a single surface or both surfaces of a polyimide film; and performing corona treatment on a surface of the fluorocarbon resin layer under a condition of 100 W·min./m$^2$ or more of corona density.

4. A reformed polyimide fluorocarbon resin laminated film having 0.4–0.8 kg/cm of adhesive strength when tested by 90° peel strength of adhesion between said film and an electroplated aluminum layer, said film produced by a method comprising the steps of:

laminating a fluorocarbon resin layer on a single surface or both surfaces of a polyimide film;

performing corona treatment on a surface of the fluorocarbon resin layer under a condition of 100 W·min./m$^2$ or more of corona density;

coating a surface of the fluorocarbon resin layer with a coating composition consisting of a silane coupling agent and a solvent; and drying.

5. The reformed polyimide fluorocarbon resin laminated film according to claim 4, wherein said coupling agent is a silane coupling agent having a functional group selected from the group consisting of chloro, glycido and amino.

6. The reformed polyimide fluorocarbon resin laminated film of claim 1 is a masking tape of a film capacitor.

7. The masking tape of a film capacitor of claim 6, wherein said coupling agent is a silane coupling agent having a functional group selected from the group consisting of chloro, glycido, and amino.

* * * * *